US010648774B2

(12) United States Patent
Usuki

(10) Patent No.: US 10,648,774 B2
(45) Date of Patent: May 12, 2020

(54) DISPLAY APPARATUS OF INTERCEPTION AREA, DISPLAY METHOD AND INTERCEPTION SYSTEM

(71) Applicant: MITSUBISHI HEAVY INDUSTRIES, LTD., Tokyo (JP)

(72) Inventor: Tomoaki Usuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/261,899

(22) Filed: Jan. 30, 2019

(65) Prior Publication Data
US 2019/0249953 A1 Aug. 15, 2019

(30) Foreign Application Priority Data
Feb. 15, 2018 (JP) .................. 2018-025066

(51) Int. Cl.
| G06G 7/80 | (2006.01) |
| F41G 3/04 | (2006.01) |
| G06F 3/14 | (2006.01) |
| G09G 5/14 | (2006.01) |

(52) U.S. Cl.
CPC .............. *F41G 3/04* (2013.01); *G06F 3/14* (2013.01); *G09G 5/14* (2013.01)

(58) Field of Classification Search
USPC ....................................................... 235/417
See application file for complete search history.

(56) References Cited

U.S. PATENT DOCUMENTS

| 5,418,608 A * | 5/1995 | Caimi ................ G01S 17/89 348/139 |
| 6,386,879 B1 * | 5/2002 | Varshneya ............ F41G 3/265 434/16 |
| 2004/0033472 A1 * | 2/2004 | Varshneya ............ F41G 3/265 434/23 |
| 2007/0243504 A1 * | 10/2007 | Bjorkman ............ F41G 3/265 434/22 |

FOREIGN PATENT DOCUMENTS

| JP | 2005-241046 | 9/2005 |
| JP | 2005-241047 | 9/2005 |
| JP | 2013-235367 | 11/2013 |

* cited by examiner

*Primary Examiner* — Tuyen K Vo
(74) *Attorney, Agent, or Firm* — Wenderoth, Lind & Ponack, L.L.P.

(57) ABSTRACT

In a display apparatus of an interception area, a first detection device scans a first area containing at least a part of a firing range of a first weapon to detect an obstacle. A first terminal calculates the first interception area in which the first weapon is possible to intercept, based on data of the detected obstacle and data of the first weapon; calculates a first display area showing the first interception area on a screen based on the first interception area; receives second area data generated by a second terminal, and calculates a second display area based on the second area data. The second display area shows on the screen an area in which a second weapon is possible to intercept. The first terminal displays the first display area and the second display area.

10 Claims, 16 Drawing Sheets

Fig. 7

400:EQUIPPED WEAPON DATA

| KIND | REMAINING NUMBER |
|---|---|
|  |  |
|  |  |
|  |  |

500: WEAPON DATA

| KIND | FIRING RANGE | FIRING RANGE ANGLE | AREA OF KILL PROBABILITY OF 80% |
|---|---|---|---|
| | | | |
| | | | |
| | | | |

510, 520, 530, 540

540: AREA OF KILL PROBABILITY OF 80%
520: FIRING RANGE
530: FIRING RANGE ANGLE
L1, L2

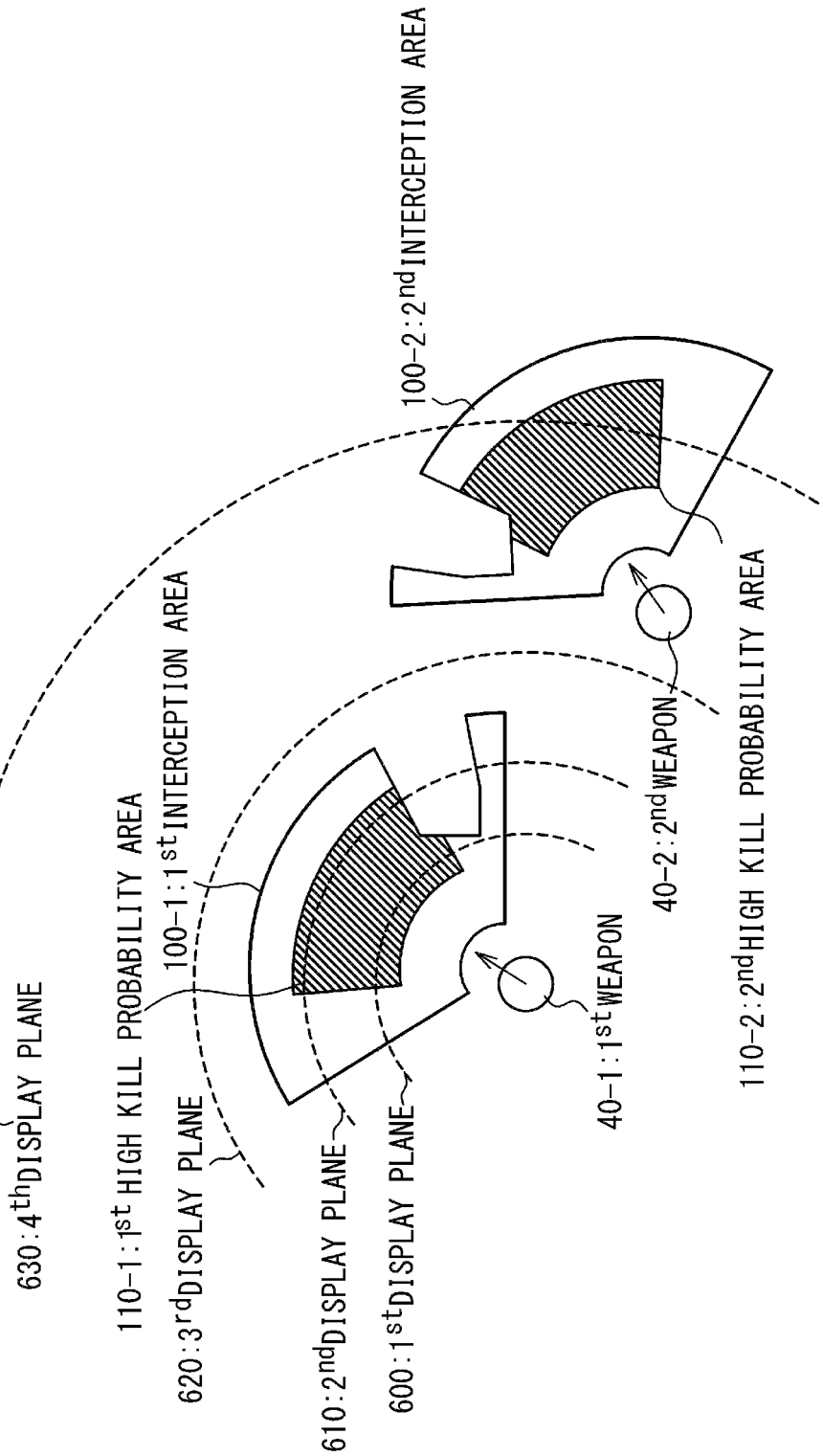

DISPLAY APPARATUS OF INTERCEPTION AREA, DISPLAY METHOD AND INTERCEPTION SYSTEM

TECHNICAL FIELD

The present invention relates to a display apparatus and display method of an interception area, and an interception system.

BACKGROUND ART

The interception area of an interception system depends on the arrangement of radar devices and launchers, and peripheral landform. Therefore, it is important to arrange the launchers according to the interception area for the purpose of sufficient exercise of interception performance.

Patent Literature 1 discloses an air defense system in which air defense capabilities are deployed according to priorities set to air defense arias allocated to the launchers. Specifically, to detect a target in the area with a high priority more quickly than another area, the number of pulses of a laser sensor in the area with the high priority is increased more than that of the other area.

Patent Literature 2 discloses an air defense system in which an interception area is displayed three-dimensionally in a launcher. The launcher has map data in a deployed area, and calculates and displays the interception area three-dimensionally based on the map data.

Patent Literature 3 discloses a display system in which a flight route of an aircraft can be recognized visually by an intuitive operation. In the display system, the flight route can be set and displayed intuitively by using AR technique.

CITATION LIST

[Patent Literature 1] JP 2005-241046A
[Patent Literature 2] JP 2005-241047A
[Patent Literature 3] JP 2013-235367A

SUMMARY OF THE INVENTION

Since map data is used to calculate the interception area of an interception system, the interception area cannot be calculated in an area where is not contained in the map data. Also, obstacles such as buildings are not contained in the map data in many cases, and the interception area is restricted by the obstacles. For this reason, in the interception system receiving large influence by the obstacles, the deployment of weapons is carried out based on the scent and experience of personnel.

Taking the above-mentioned situation into account, the present invention has as an object, to effectively deploy weapons in an interception system by displaying the interception area, taking an influence by obstacles into account.

Other objects could be understood from the following description of embodiments.

To achieve the above purpose, a display apparatus of an interception area according to the present invention has a first detection device and a first terminal. The first detection device scans a first area containing at least a part of a firing range of a first weapon to detect an obstacle. The first terminal has a first area calculating section, a first display calculating section and a first displaying section. The first area calculating section calculates a first interception area in which the first weapon is possible to intercept, based on data of the detected obstacle and data of the first weapon. The first display calculating section calculates a first display area showing a first interception area on a screen based on the first interception area. The first displaying section displays the first display area. Moreover, the first area calculating section generates the first area data which contains the first interception area. The first display calculating section further receives second area data generated by the second terminal, and calculates the second display area based on the second area data. The second display area shows an area in which a second weapon is possible to intercept, on the screen. Moreover, the first displaying section displays the second display area.

The above-mentioned first area calculating section may determine the first area based on the data of the first weapon, and may determine the first interception area by excluding a first un-scanned space which is more distant from the first weapon than the obstacle and is in the same direction as the obstacle, from the firing range of the first weapon.

The above-mentioned second area signal may contain the second interception area in which the second weapon is possible intercept. In this case, the first display calculating section may calculate the second display area by excluding from the second interception area a space which is more distant from the first terminal than a second un-scanned space where the second interception area is excluded from the firing area of the second weapon, and which is in the same direction as the second un-scanned space. The first displaying section displays the first display area and the second display area three-dimensionally.

The above-mentioned second area signal may contain data of second weapon and a position of second weapon. In this case, the first display calculating section calculates the firing range of second weapon based on the data of second weapon and the position of the second weapon. Also, the first display calculating section calculates the second un-scanned space by excluding the second interception area from the firing range of the second weapon.

The above-mentioned second area data may contain the second interception area in which the second weapon is possible to intercept. In this case, the first display calculating section may calculate as first display area the first interception area contained on a display plane separate by a previously determined distance from the position of the first terminal, and may calculate as second display area the second interception area contained on the display plane. The first displaying section displays the first display area and the second display area three-dimensionally.

Moreover, the above-mentioned first terminal may include an input device. In this case, there are a plurality of the display planes. The first displaying section may display the first display area and the second display area on one of the plurality of display planes specified from the input device.

The above-mentioned first area calculating section may calculate a probability area as an area where an interception probability by the first weapon has been previously determined based on the data of first weapon, and may calculate as the kill probability area a probability area contained in first interception area. In this case, the first display calculating section calculates the kill probability display area showing the kill probability area on the screen based on the kill probability area. The first displaying section displays a kill probability display area.

The above-mentioned first displaying section displays first display area and the second display area distinguishably.

The interception system according to the present invention has the above-mentioned display apparatus of the interception area and a mobile terminal. The mobile terminal has a second display calculating section and a second displaying section. The second display calculating section receives the first area data from the first terminal, and calculates a first display area. The second displaying section displays the first display area. Moreover, the mobile terminal displays only the display area calculated based on the area data received from another terminal.

A method of displaying an interception area according to the present invention includes a step of scanning a first area containing at least a part of a firing range of a first weapon to detect an obstacle; a step of calculating a first interception area in which the first weapon is possible to intercept, based on data of the detected obstacle and data of the first weapon; a step of generating first area data containing the first interception area; a step of calculating a first display area showing the first interception area on a screen based on the first interception area; a step of receiving from another terminal second area data containing a second interception area in which a second weapon is possible to intercept; a step of calculating a second display area showing a second interception area on the screen based on the second area data; and a step of displaying the first display area and the second display area.

According to the present invention, the interception area to have considered an influence by obstacles and so on can be displayed.

BRIEF DESCRIPTION OF THE DRAWINGS

FIG. 7 is a diagram showing equipped weapon data.

FIG. 17 is a diagram showing an example of method of calculating a display area.

DESCRIPTION OF THE EMBODIMENTS

Figure 1:
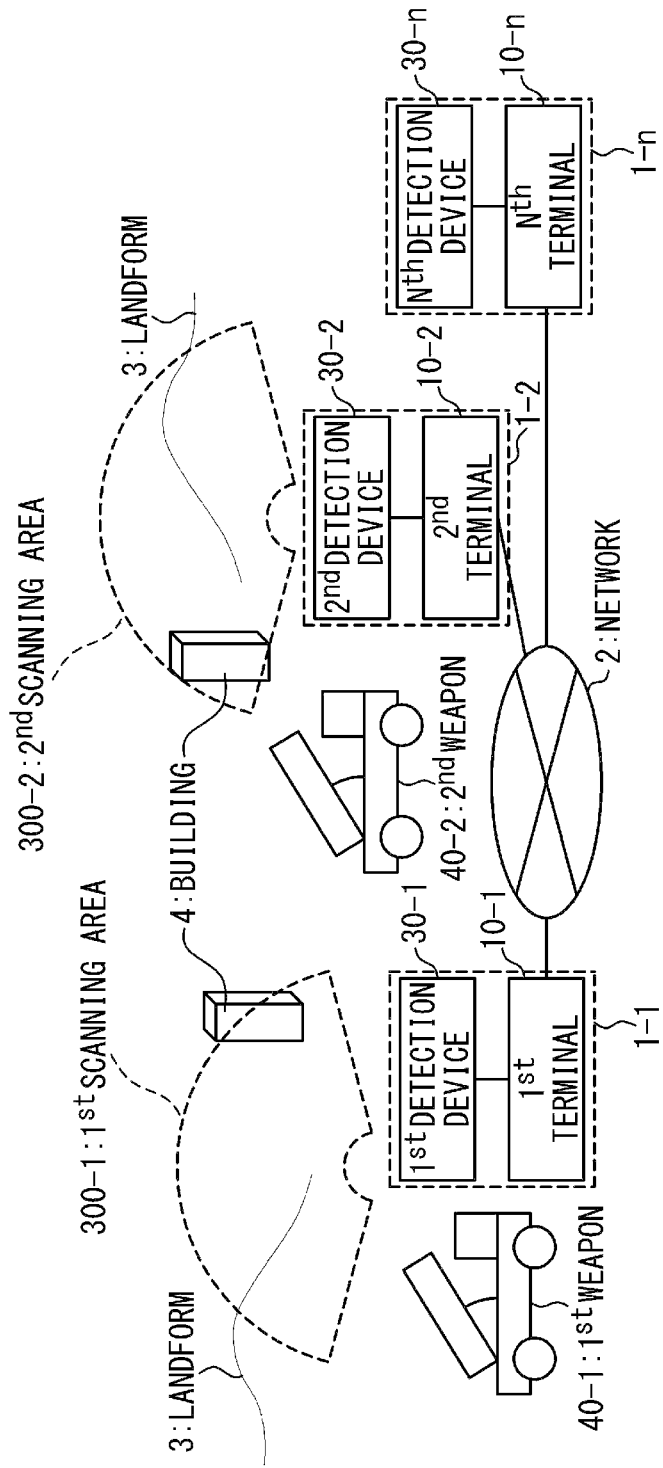
FIG. 1 is a schematic diagram showing an interception system having a display apparatus according to an embodiment.

The outline of interception system according to an embodiment will be described. As shown in FIG. 1, the interception system has a plurality of display apparatuses 1 (1-1, 1-2, . . . , and 1-$n$), a plurality of weapons 40 (40-1, 40-2, . . . ) and a network 2. The display apparatus 1 displays interception areas by the weapons 40. Also, the plurality of display apparatuses 1 are connected to each other through the network 2 to carry out the transmission and reception of data. An interception missile, an automatic cannon and so on are exemplified as the weapons 40.

Each of the display apparatuses 1 (1-1, 1-2, . . . , and 1-$n$) has a corresponding one of terminals 10 (10-1, 10-2, . . . , and 10-$n$) and a corresponding one of detection devices 30 (30-1, 30-2, . . . , and 30-$n$). The first detection device 30-1 is provided for the first weapon 40-1. Scanning areas 300 (300-1, 300-2, . . . , and 300-$n$) are scanned by the detection devices 30. The first terminal 10-1 is provided in the neighborhood of the first weapon 40-1. The first detection device 30-1 detects obstacles such as a landform 3 and a building 4 that exist in a firing range of the first weapon 40-1. The first terminal 10-1 calculates and displays an interception area of the first weapon 40-1 according to the detected obstacles and the performance data or specification of first weapon 40-1. Also, the calculated interception area is shared and displayed by the remaining terminals 10-2, . . . , 10-$n$ through the network 2. The remaining display apparatuses 1-2, . . . , 1-$n$ operate like the display apparatus 1-1.

Figure 2:
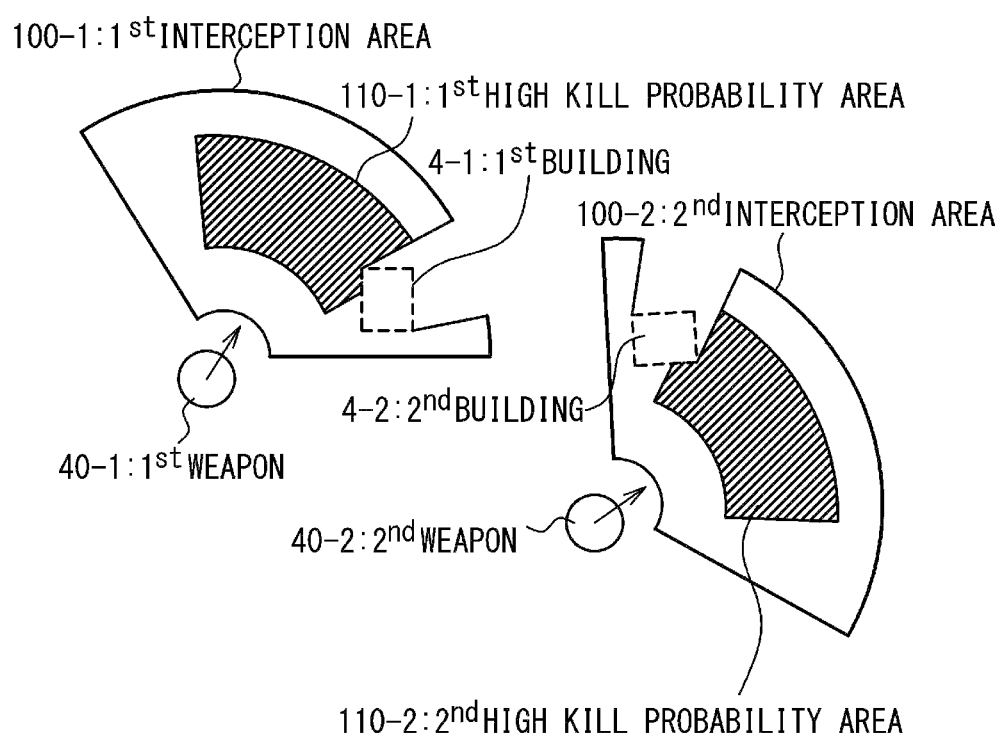
FIG. 2 is a diagram showing an interception area.

The first detection device 30-1 scans a first scanning area 300-1 of scanning areas 300 (300-1, 300-2, . . . , 300-$n$) to detect an obstacle such as a landform 3 and a building 4. For example, the first scanning area 300-1 is a space contained in the firing range of the first weapon 40-1. As shown in FIG. 2, the first detection device 30-1 detects a first building 4-1 in the firing range of the first weapon 40-1 as the obstacle, and transmits obstacle data showing the detected obstacle to the first terminal 10-1. Here, the first scanning area 300-1 may contain an area except for the firing range of the first weapon 40-1. Also, the first detection device 30-1 contains a positioning system by which a current position of the first detection device 30-1 can be acquired. For example, a reception device for a global positioning system (GPS) is exemplified.

Figure 3:
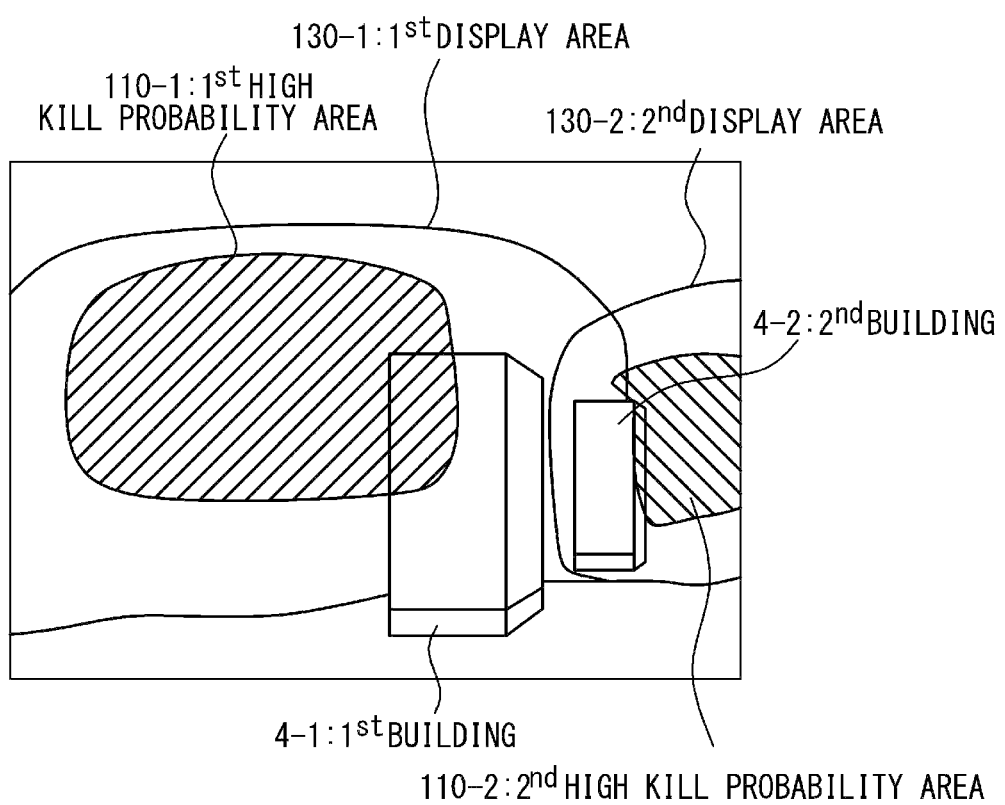
FIG. 3 is a screen example of interception area to be displayed three-dimensionally.

The first terminal 10-1 calculates and displays the interception area of the first weapon 40-1 based on the received obstacle data. As shown in FIG. 2, the first building 4-1 exists in the firing range of the first weapon 40-1. Therefore, the first weapon 40-1 cannot intercept a target in a space hidden by the first building 4-1. For this reason, the first terminal 10-1 determines an interception possible area for the first weapon 40-1 by excluding this hidden space from the firing range of the first weapon 40-1. Also, a space where the interception is possible in high probability has been determined based on the performance data of the first weapon 40-1. The first terminal 10-1 determines a first high kill probability area 110-1 by excluding the space hidden by the first building 4-1 from the previously determined space where the interception is possible in high probability, like the interception possible space. The first high kill probability area 110-1 shows a space where the first weapon 40-1 can intercept the target in high probability. The first terminal 10-1 calculates the first display area to be displayed on the screen as the first interception area 100-1 based on the first interception area 100-1. Also, the first terminal 10-1 calculates an area to be displayed on the screen as the space where the interception can be carried out in high probability, based on the first high kill probability area 110-1. The first terminal 10-1 displays a two-dimensional screen in which the calculated areas are superimposed on map data. Moreover, as shown in FIG. 3, the first terminal 10-1 displays a three-dimensional screen in which the first display area 130-1 is added to scenery viewed from the position of the first terminal 10-1. The screen display which can be viewed three-dimensionally is contained in the three-dimensional screen by both ocular parallaxes. Also, scenery viewed from a position may be displayed on the screen like the scenery photograph. Note that the map data displayed two-dimensionally has been previously stored in the first terminal 10-1.

The first terminal 10-1 transmits data of the first interception area 100-1 to the other terminals 10. Thus, the terminals 10 can share the interception areas 100 by the whole interception system. For example, the first terminal 10-1 receives data of a second interception area 100-2 by the second weapon 40-2 from the second terminal 10-2. The first terminal 10-1 calculates a second display area 130-2 to be displayed on the screen as the second interception area 100-2 based on the received data, and displays the calculated second display area 130-2 on a map. Also, the first terminal 10-1 displays the second display area 130-2 three-dimensionally, in addition to the first display area 130-1, as shown in FIG. 3.

The second detection device 30-2, . . . , the $n^{th}$ detection device 30-$n$ operate like the first detection device 30-1. Also, the second terminal 10-2, . . . , the $n^{th}$ terminal 10-$n$ operate like the first terminal 10-1.

In this way, the display device 1 detects the obstacles existing in the firing range of weapon 40, and calculates the corresponding interception area 100 (100-1, 100-2, . . . ). Thus, the interception area 100 can be determined by taking the influence of the obstacles into account. Also, since the interception areas 100 of the whole interception system can be displayed, the efficient arrangement of weapons can be realized.

Figure 4:
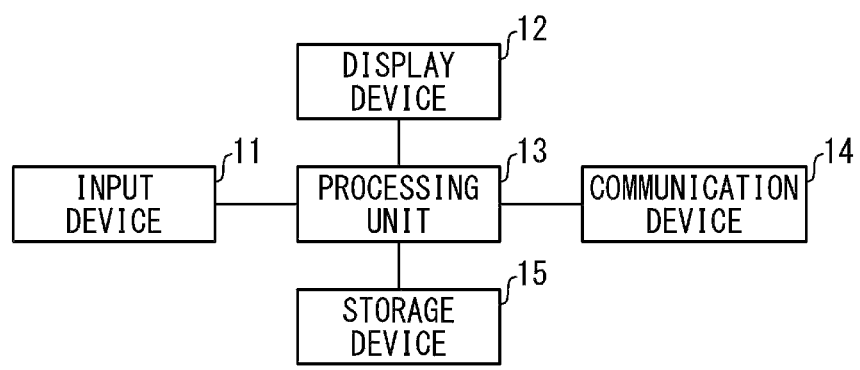
FIG. 4 is a diagram showing an example of hardware configuration of each of terminals in FIG. 1.

The hardware configuration of terminal 10 will be described. As shown in FIG. 4, the terminal 10 has an input device 11, a display device 12, a processing unit 13, a communication device 14 and a storage device 15. The display device 12 displays data of display area 130 and so on. For example, a mobile terminal such as a head-mounted display is contained in the terminal 10. The head-mounted display may display virtual reality (VR) or display it as augmented reality (AR) to be superimposed on actual scenery. The storage device 15 stores a program to be executed by the processing unit 13, the performance data of first weapon 40-1 and so on. Also, the storage device 15 stores data used when the processing unit 13 executes processing. The processing unit 13 carries out calculation processing of data to be displayed on the display device 12 such as calculation of the interception area 100 and the display area 130 (130-1, 130-2, . . . ). The communication device 14 is connected with the network 2 to carry out the transmission and reception of data to and from another terminal 10. The input device 11 is used to input data to the terminal 10, and a keyboard, a mouse, a touch display and so on are exemplified. Also, a positioning system to acquire the current position of the terminal 10 is contained in the input device 11. For example, a reception device of the global positioning system (GPS) is exemplified.

Figure 5:
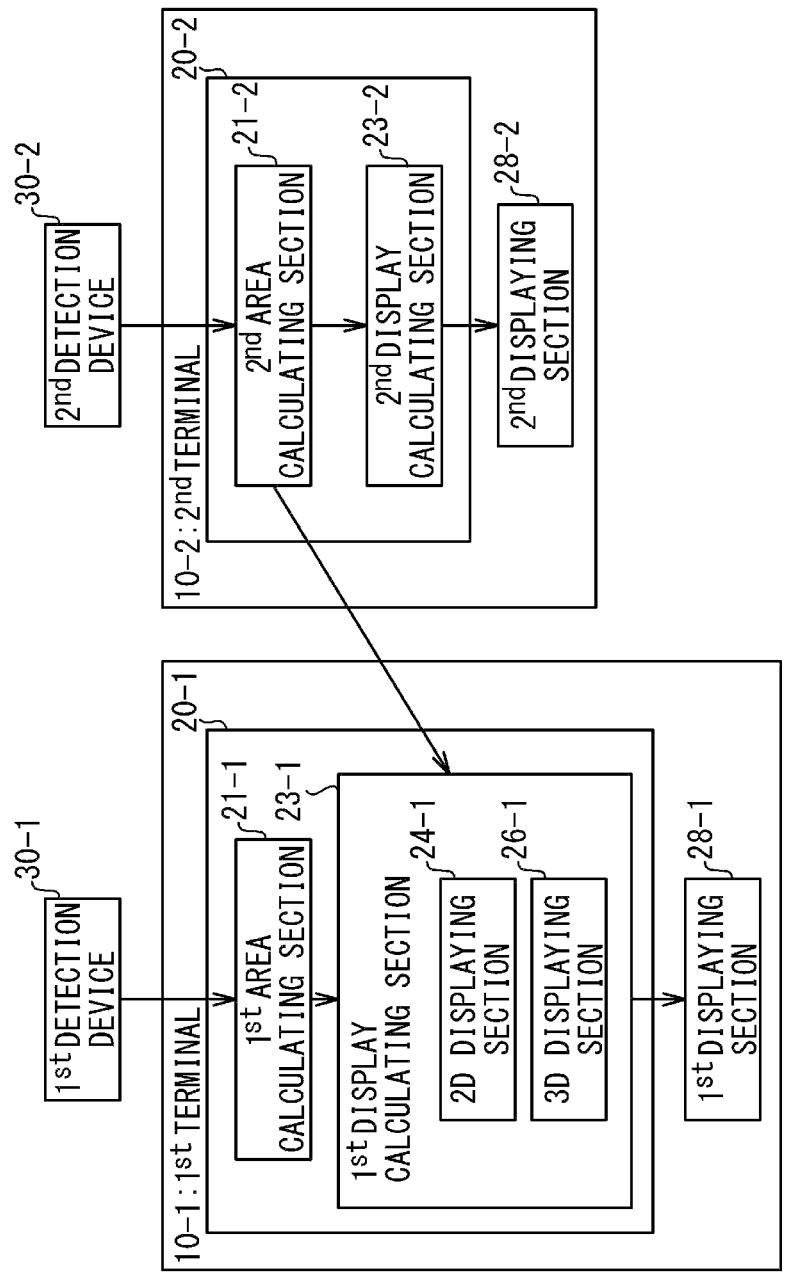
FIG. 5 is a diagram showing an example of functional configuration of the terminal of FIG. 1.

The functional configuration of terminal 10 will be described. As shown in FIG. 5, the first terminal 10-1 has a first calculating section 20-1 for calculating the interception area 100 and the display area 130, and a first displaying section 28-1 for displaying the display areas 130. The first displaying section 28-1 displays the display areas 130 two-dimensionally or three-dimensionally. The first calculating section 20-1 is realized by executing the program by the processing unit 13. The first displaying section 28-1 is mainly realized by the display device 12.

The first calculating section 20-1 has a first area calculating section 21-1 and a first display calculating section 23-1. The first area calculating section 21-1 receives data of obstacles from the first detection device 30-1. The first area calculating section 21-1 calculates the first interception area 100-1 of the first weapon 40-1 based on the obstacle data and the performance data of the first weapon 40-1. The first display calculating section 23-1 receives data of the second interception area 100-2 of the second weapon 40-2 from the second terminal 10-2, and calculates the display areas 130 to be displayed on first displaying section 28-1 from the first interception area 100-1 and the second interception area 100-2. The first displaying section 28-1 displays the calculated display areas 130.

Also, the first display calculating section 23-1 has a two-dimensional displaying section 24-1 and a three-dimensional displaying section 26-1. The two-dimensional displaying section 24-1 calculates the display areas 130 to be displayed on a two-dimensional map. As shown in FIG. 3, the three-dimensional displaying section 26-1 calculates the display areas 130 to be displayed three-dimensionally. The three-dimensional displaying section 26-1 may acquire a position of the first terminal 10-1 and calculate the display areas 130 to be superimposed on the scenery based on the position.

The second terminal 10-2, . . . , and the $n^{th}$ terminal 10-$n$ has the same configuration as the first terminal 10-1. The first calculating section 20-1 of the first terminal 10-1, the second calculating section 20-2 of the second terminal 10-2, . . . , the $n^{th}$ calculating section 20-$n$ of the $n^{th}$ terminal 10-$n$ are called the calculating sections 20. The first area calculating section 21-1, the second area calculating section 21-2, . . . , and the $n^{th}$ area calculating section 21-$n$ are called the area calculating sections 21. The first display calculating section 23-1, the second display calculating section 23-2, . . . , and the $n^{th}$ display calculating section 23-$n$ are called the display calculating sections 23. The first displaying section 28-1, the second displaying section 28-2, . . . , and the $n^{th}$ displaying section 28-$n$ are called the displaying sections 28.

(Operation of Display Apparatus)

Figure 6:
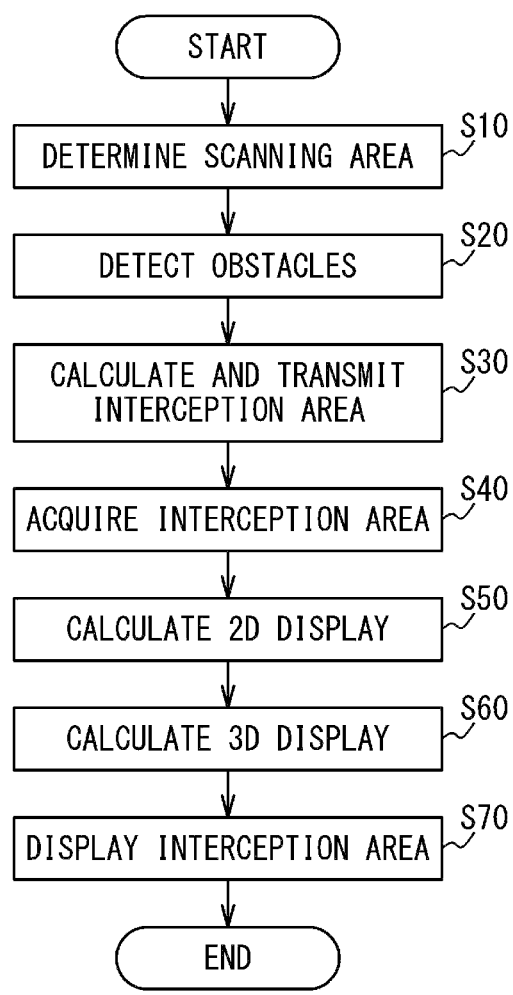
FIG. 6 is a flow chart of processing of the display device.

The operation of display apparatus 1 will be described. As shown in FIG. 6, at step S10, the first area calculating section 21-1 determines the first scanning area 300-1 for the first detection device 30-1. The first area calculating section 21-1 holds equipped weapon data 400 and weapon data 500. To acquire a usable kind of first weapon 40-1, the first area calculating section 21-1 extracts kinds of weapons in which the remaining number is one or more, from the equipped weapon data 400, and acquires the firing range of the first weapon 40-1 from the weapon data 500 based on the extracted kinds of the weapons. The first area calculating section 21-1 determines the firing range of the first weapon 40-1 as the first scanning area 300-1 of the first detection device 30-1.

Figures 8A, 8B:
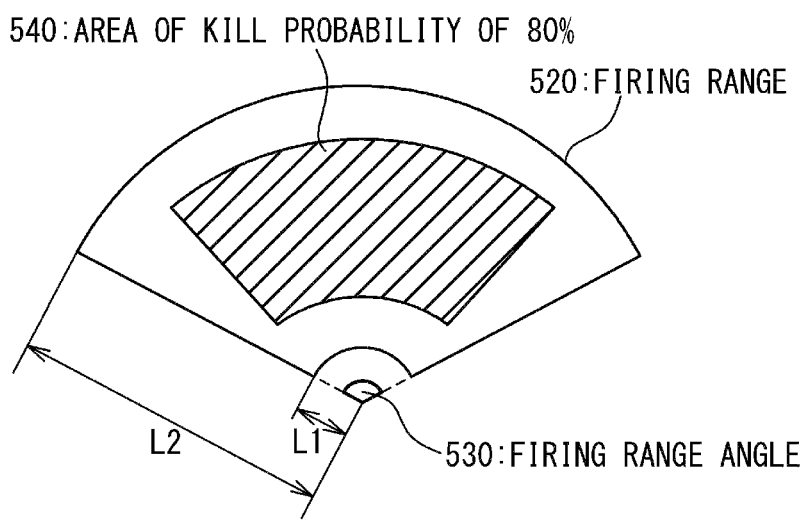
FIG. 8A is a diagram showing weapon data.
FIG. 8B is a diagram showing items in FIG. 8A.

Here, as shown in FIG. 7, the equipped weapon data 400 shows the remaining number of weapons for every kind of weapon equipped as the first weapon 40-1. Also, the weapon data 500 shows the performance data of each of the weapons. For example, as shown in FIG. 8A, the weapon data 500 contains a firing range 520, a firing range angle 530 and an area 540 having the kill probability of 80% for every kind 510 of the weapons. The firing range angle 530 shows an angle by which the weapon of the kind 510 is possible to intercept, as shown in FIG. 8B. For example, the angle contains an angle in a horizontal direction and an angle in a direction orthogonal to the horizontal direction. Also, this angle may be able to be determined based on the direction of weapon 40. For example, when the weapon 40 is an interception missile, the interception possible angle may be able to be determined based on the direction of a launching pipe of a launcher. Also, the firing range 520 shows a distance from the weapon, and may show an interception possible minimum distance L1 and an interception possible maximum distance L2.

Figure 9:
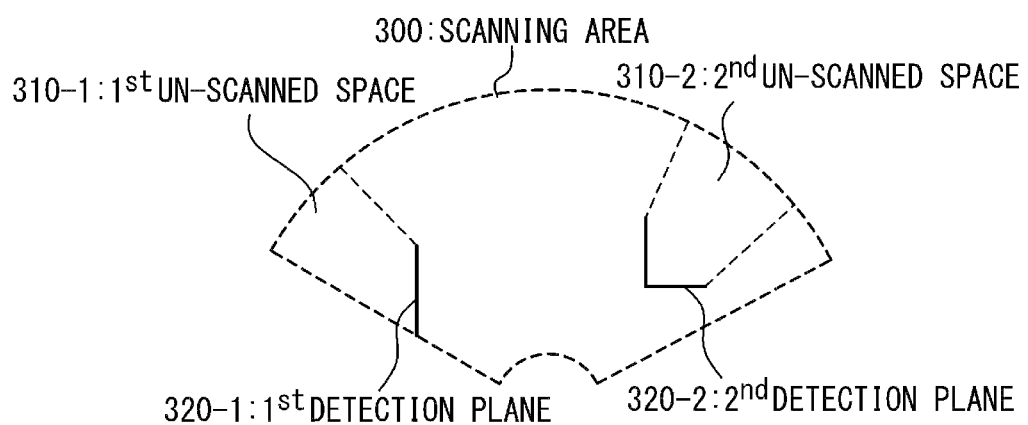
FIG. 9 is a diagram showing un-scanned spaces and detection planes showing the processing of FIG. 6.

At step S20, the first detection device 30-1 scans the scanning area 300 to detect the obstacles. As shown in FIG. 9, the first detection device 30-1 acquires the first scanning area 300-1 from the first area calculating section 21-1. The first detection device 30-1 uses a radar device to detect the obstacles contained in the first scanning area 300-1. For example, as shown in FIG. 9, the first detection device 30-1 detects a first detection plane 320-1 and a second detection plane 320-2 as the obstacles. The first detection device 30-1 generates detection data showing the first detection plane 320-1 and the second detection plane 320-2. Also, the first detection device 30-1 acquires a current position thereof from the global positioning system. Data showing the current position of the first detection device 30-1 is contained in the detection data.

Figure 10:
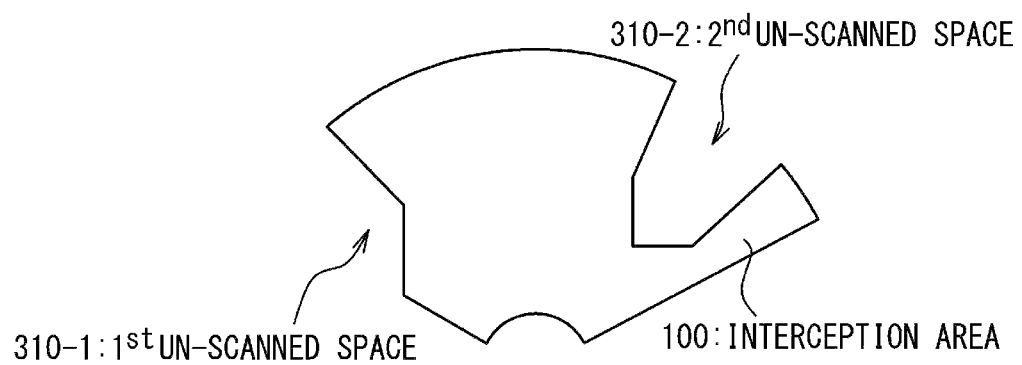
FIG. 10 is a diagram showing the processing of calculating the interception area in the processing of FIG. 6.
Figure 11:
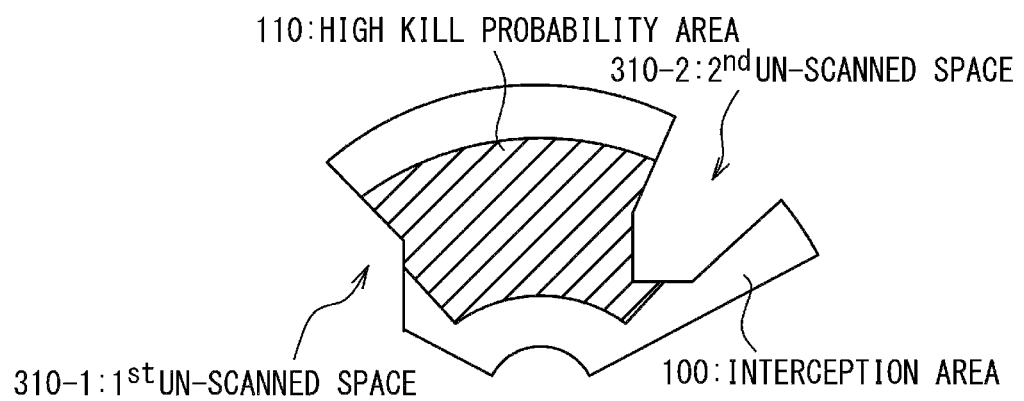
FIG. 11 is a diagram showing the processing of calculating a high kill probability area in the processing of FIG. 6.
Figure 12:
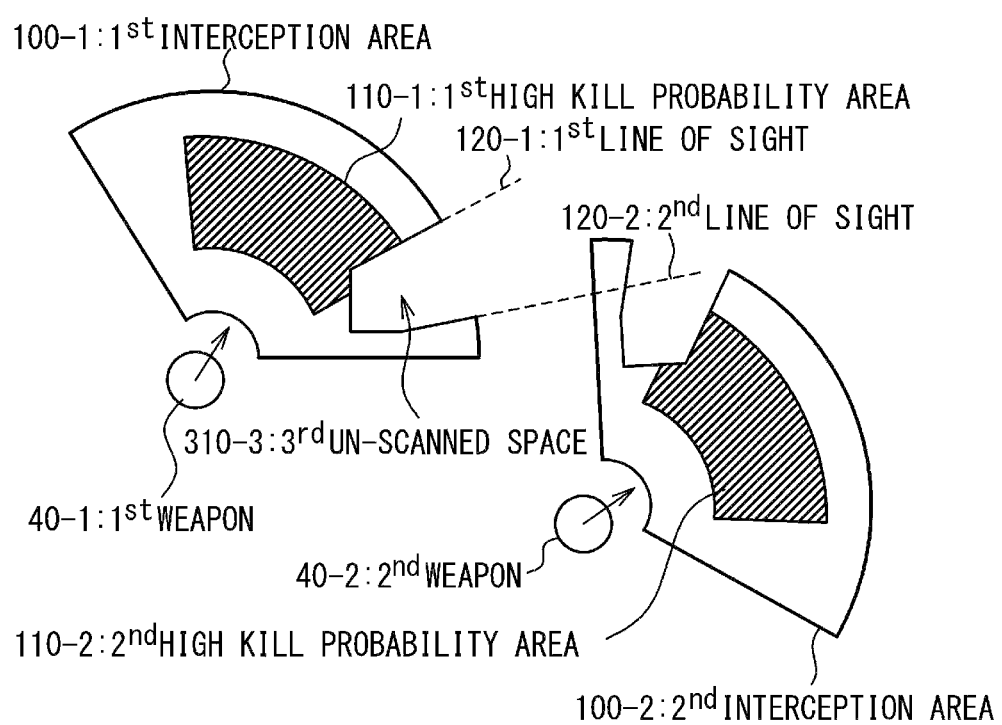
FIG. 12 is a diagram showing the processing of a third un-scanned space in the processing of FIG. 6.

At step S30, the first area calculating section 21-1 calculates the interception area 100 of the first weapon 40-1 to transmit to the other terminals 10. The first area calculating section 21-1 receives the detection data from the first detection device 30-1 and acquires the data showing first detection plane 320-1 and the data showing second detection plane 320-2. Here, the first detection device 30-1 cannot scan a space on the back side of the first detection plane 320-1. In other words, the first detection device 30-1 cannot scan a first un-scanned space 310-1 existing in the same direction as the first detection plane 320-1 and being more distant from the first detection device 30-1 than the first detection plane 320-1. In the same way, the first detection device 30-1 cannot scan a second un-scanned space 310-2 existing in the same direction as the second detection plane 320-2 and being more distant from the first detection device 30-1 than the second detection plane 320-2. The first area calculating section 21-1 calculates the first un-scanned space 310-1 and the second un-scanned space 310-2 based on the first detection plane 320-1 and the second detection plane 320-2. Since the first detection plane 320-1 and the second detection plane 320-2 become the obstacles, the first un-scanned space 310-1 and the second un-scanned space 310-2 are the space where the first weapon 40-1 cannot intercept. Therefore, the first area calculating section 21-1 calculates the interception area 100 by excluding the first un-scanned space 310-1 and the second un-scanned space 310-2 from the firing range of the first weapon 40-1 acquired from the weapon data 500, as shown in FIG. 10. Also, the first area calculating section 21-1 extracts an area 540 of the kill probability of 80% from the weapon data 500, and calculates a space of the high kill probability for the first weapon 40-1. The first area calculating section 21-1 determines an area where the calculated space and the interception area 100 overlap, as the high kill probability area 110, as shown in FIG. 11. Moreover, the first area calculating section 21-1 generates area data containing data showing the interception area 100, data showing high kill probability area 110 and data showing the kind of the first weapon, to transmit to the other terminals 10. Also, the first area calculating section 21-1 extracts the position data showing the current position of the first detection device 30-1 from the detection data, and makes the position data of the first detection device 30-1 to be contained in the area data.

At step S40, the first display calculating section 23-1 acquires the interception area 100. Specifically, the first display calculating section 23-1 acquires the interception area 100 of the first weapon 40-1 from the first area calculating section 21-1. Also, the first display calculating section 23-1 receives the area data generated by the area calculating sections 21 of the other terminals 10 to know the interception areas 100 of the other weapons 40. Thus, the first display calculating section 23-1 acquires the interception areas 100 of the whole interception system.

At step S50, the two-dimensional displaying section 24-1 calculates the two-dimensional display areas 130 based on the acquired interception areas 100. As shown in FIG. 2, the two-dimensional displaying section 24-1 acquires the position data of detection devices 30 from the area data. Here, the detection devices 30 may be provided on the weapons 40. In such a case, the two-dimensional displaying section 24-1 can acquire the positions of weapons 40, and determines the position where the first interception area 100-1 should be displayed, based on the position data of the first weapon 40-1 and the first interception area 100-1. In the same way, the two-dimensional displaying section 24-1 determines the position where the second interception area 100-2 should be displayed, based on the position of second weapon 40-2 and the second interception area 100-2.

The two-dimensional displaying section 24-1 generates a screen in which the first interception area 100-1 and the second interception area 100-2 are displayed, based on the determined positions and previously determined altitudes. Each of The first interception area 100-1 and the second interception area 100-2 changes depending on the altitude. For this reason, the two-dimensional displaying section 24-1 calculates the first display area 130-1 showing the first interception area 100-1 at the previously determined altitude. In the same way, the two-dimensional displaying section 24-1 calculates the second display area 130-2 showing the second interception area 100-2 at the previously determined altitude. The two-dimensional displaying section 24-1 generates the screen in which the first display area 130-1 and the second display area 130-2 are displayed. For example, the previously determined altitudes are altitudes determined when the interception system starts to use.

At step S60, the three-dimensional displaying section 26-1 calculates the three-dimensional display areas 130 based on the acquired interception areas 100, as shown in FIG. 3. Firstly, the three-dimensional displaying section 26-1 acquires the position of the first terminal 10-1 and determines the position of interception area 100. The input device 11 contains a device for the global positioning system. Therefore, the three-dimensional displaying section 26-1 acquires the position of the first terminal 10-1 from the input device 11. The three-dimensional displaying section 26-1 calculates positions where the first interception area 100-1 and the first high kill probability area 110-1 calculated by the first terminal 10-1 are displayed based on the acquired position. Also, the three-dimensional displaying section 26-1 determines the position of second interception area 100-2 based on the position of second weapon 40-2.

Next, the three-dimensional displaying section 26-1 calculates a part of the interception area 100 that should not be displayed due to the obstacles. To calculate the position of each obstacle from the first interception area 100-1, the three-dimensional displaying section 26-1 calculates the firing range of the first weapon 40-1 based on the equipped weapon data 400 and the weapon data 500. As shown in FIG.

12, the three-dimensional displaying section 26-1 calculates a third un-scanned space 310-3 by excluding the first interception area 100-1 from the calculated firing range. The third un-scanned space 310-3 is the space where the scan detection device 30 cannot scan due to the obstacles. Therefore, the third un-scanned space 310-3 can be regarded as an obstacle space. For this reason, the three-dimensional displaying section 26-1 calculates the second display area 130-2 to display the second interception area 100-2, by excluding from the second interception area 100-2 the space existing in the same direction as the third un-scanned space 310-3 from the position of the first terminal 10-1 and being more distant than the third un-scanned space 310-3. In other words, a space which is between a first line of sight 120-1 and a second line of sight 120-2 and is farther from the first weapon 40-1 than the third un-scanned space 310-3 is excluded from the interception area 100. Also, the three-dimensional displaying section 26-1 may acquire the third un-scanned space 310-3 from the first area calculating section 21-1.

Figure 13:
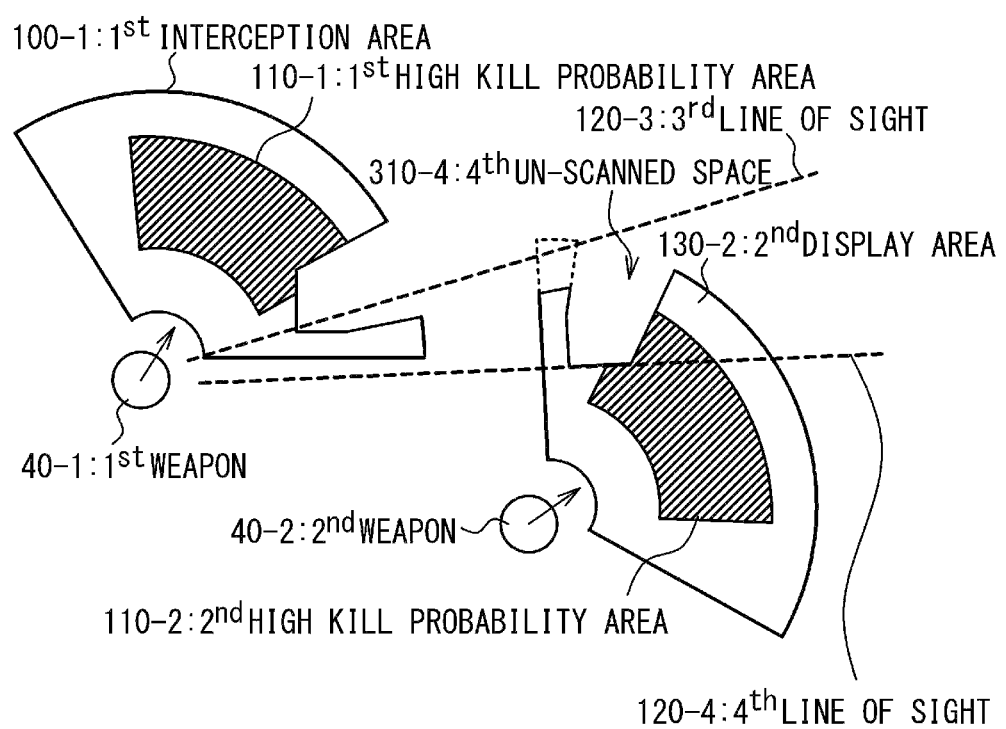
FIG. 13 is a diagram showing the processing of a fourth un-scanned space in the processing of FIG. 6.

Moreover, the three-dimensional displaying section 26-1 calculates a space that should not be displayed, from the interception areas 100 of the other weapons 40. The three-dimensional displaying section 26-1 calculates a fourth un-scanned space 310-4 based on the second interception area 100-2 and the firing range of second weapon 40-2. Thus, it is possible to suppose that the fourth un-scanned space 310-4 is an obstacle space. Therefore, as shown in FIG. 13, the three-dimensional displaying section 26-1 excludes from the second display area 130-2 a space behind the fourth un-scanned space 310-4 when viewed from the first weapon 40-1. In other words, a space where is between the third line of sight 120-3 and the fourth line of sight 120-4 and is more distant than the fourth un-scanned space 310-4 from the first weapon 40-1 is excluded from the second display area 130-2.

Figure 14:
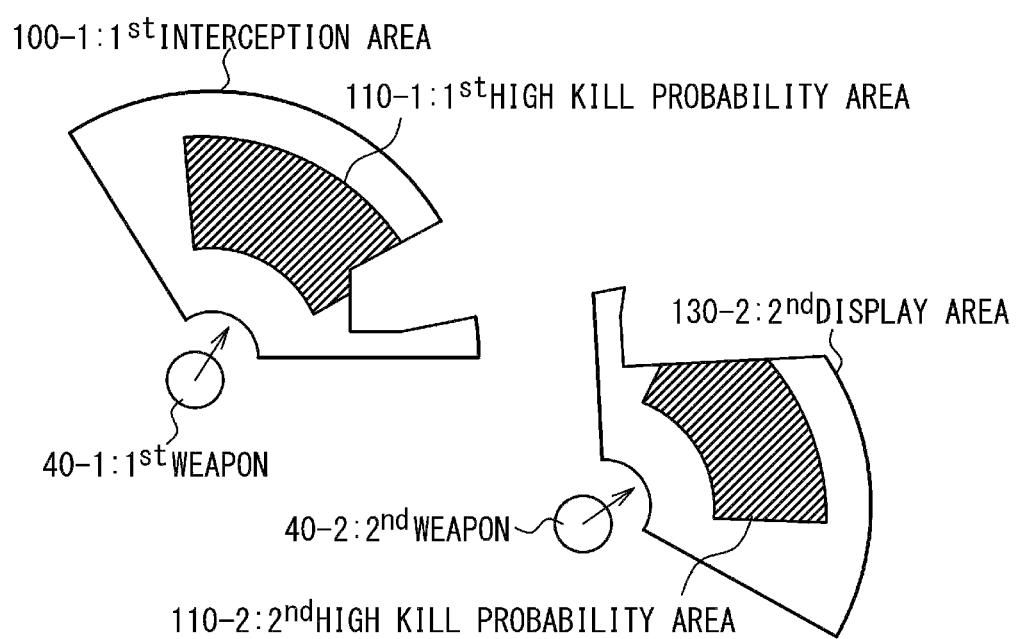
FIG. 14 is a diagram showing the interception area to explain the processing of FIG. 6.

As shown in FIG. 14, the three-dimensional displaying section 26-1 generates a screen in which the first display area 130-1 and the second display area 130-2 are displayed. In other words, the screen data in which the interception area 100 contained in an area to the un-scanned spaces 310 (310-1, 310-2) is displayed is generated as the three-dimensional display when viewed from the first weapon 40-1.

At step S70, the first displaying section 28-1 displays the screen data generated by the two-dimensional displaying section 24-1 or the three-dimensional displaying section 26-1. The first displaying section 28-1 may display the two-dimensional display screen generated by the two-dimensional displaying section 24-1 and the three-dimensional display screen generated by the three-dimensional displaying section 26-1 switchably. Also, the first displaying section 28-1 may display the two-dimensional display screen to overlap in any of the four corners (an upper left section, a lower left section, an upper right section, a lower right section) of the three-dimensional display screen. When displayed in augmented reality, the display calculating section 23 acquires the current position and direction of the head-mounted display from the head-mounted display. The display calculating section 23 calculates a display position of the interception area 100 based on the acquired data. Also, when displayed in virtual reality, the display calculating section 23 holds landform data to be displayed. The display calculating section 23 displays the scenery of the virtual reality and the interception area 100 based on the landform data. Specifically, the display calculating section 23 generates the scenery of the virtual reality based on the landform data, and displays screen data in which the interception area 100 is added to the generated scenery.

Figure 15:
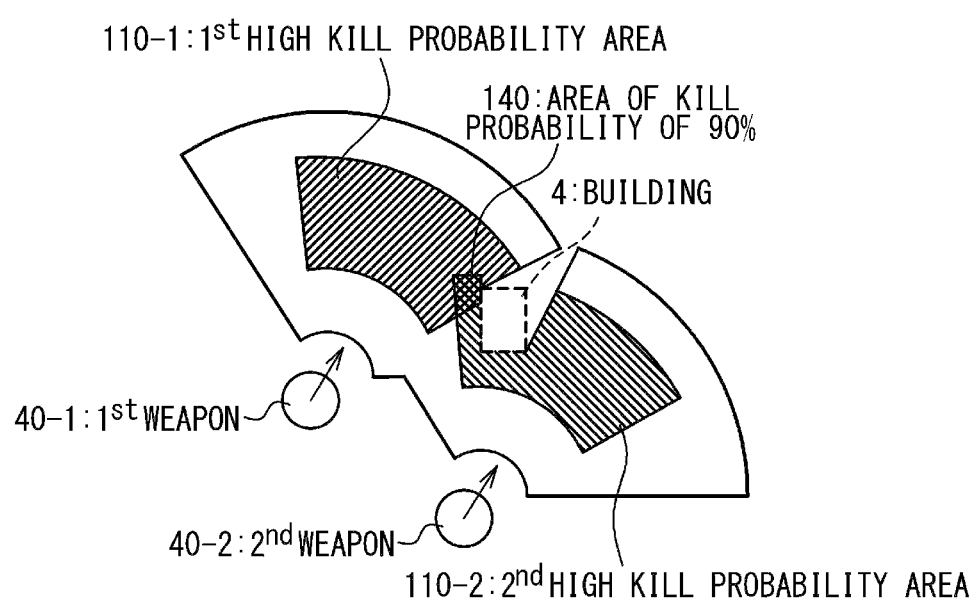
FIG. 15 is a diagram showing a display when the two interception areas overlap.

As shown in FIG. 15, when the first interception area 100-1 of the first weapon 40-1 and the second interception area 100-2 of the second weapon 40-2 overlap, both areas are displayed in an overlapping manner. In the area where the first high kill probability area 110-1 and the second high kill probability area 110-2 overlap, the kill probability when intercepted by both of the first weapon 40-1 and the second weapon 40-2, for example, an area 140 having the kill probability of 90% is displayed.

As mentioned above, each of the plurality of display apparatuses 1 calculates a corresponding interception area 100 and the calculated interception areas 100 are shared by the plurality of display apparatuses 1. Thus, the interception areas 100 of the whole interception system can be displayed in each display apparatus 1.

MODIFICATION EXAMPLE

In the above embodiments, an example has been shown in which the position data of the first detection device 30-1 is contained in the area data. However, the present invention is not limited to this. An optional method can be selected if the position of interception area 100 can be determined. For example, the position may be calculated directly from the data of interception area 100.

The first weapon 40-1 may be one of a plurality of kinds of weapons, and the area calculating section 21 may calculate the interception area 100 for the weapon of each kind. In this case, the displaying section 28 may display an area in which the interception areas 100 are superimposed. Also, the input device 11 may generate input data showing the weapon of the selected kind to be displayed, and the displaying section 28 may display only the interception area 100 for the weapon of the kind selected based on the input data. In this case, data showing the kind of weapon is contained in the interception area 100. Also, when the plurality of kinds of weapons are present, the kill probability when the plurality of kinds of weapons are used at a same time may be displayed. Also, the highest kill probability may be displayed.

In the above embodiments, an example has been shown in which the display apparatus 1 displays an area 540 having the kill probability of 80% as a high kill probability area 110. However, the present invention is not limited to this. For example, the kill probability may be set to an optional value. Also, a plurality of areas may be provided, in which an area having the kill probability of 50% or above and less than 75% is a first probability area, an area having the kill probability of 75% or above and less than 80% is a second kill probability area, and an area having the kill probability of 80% or above is a third probability area. In this case, the area calculating section 21 calculates a part of the first probability area which is contained in the interception area 100, as the first kill probability area. Also, the display calculating section 23 calculates a first kill probability display area based on the first kill probability area. The displaying section 28 displays the calculated first kill probability display area. In the same way, the area calculating section 21 calculates a second kill probability area based on the second probability area and a third kill probability area based on the third probability area. The display calculating section 23 calculates a second kill probability display area based on the second kill probability area and a third kill probability display area based on the third kill probability area. The displaying section 28 displays the second kill probability display area and the third kill probability display area.

In the above embodiments, an example has been shown in which the first detection device 30-1 is provided for the first weapon 40-1. However, the present invention is not limited to this. For example, the first detection device 30-1 may be separated from the first weapon 40-1 and moved to an arrangement scheduled position to calculate the interception area 100. In this case, the interception area 100 becomes able to be calculated without arranging the first weapon 40-1.

Figure 16:
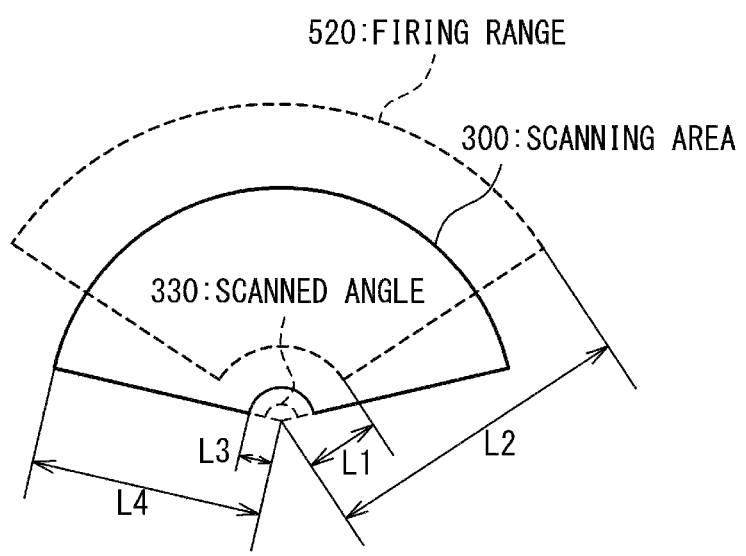
FIG. 16 is a diagram showing an example of scanning area that is determined from a firing range.

In the above embodiments, an example has been shown in which the firing range of the first weapon 40-1 is determined as a scanning area 300 of the detection device 30. However, the present invention is not limited to this. When an obstacle is nearer the first weapon 40-1, the first interception area 100-1 receives a larger influence. Therefore, an area which is nearer than the firing range of the first weapon 40-1 may be determined as the scanning area 300. Specifically, as shown in FIG. 16, the maximum distance L4 of the scanning area 300 may be shorter than the maximum distance L2 of the firing range 520. Also, the minimum distance L3 of the scanning area 300 may be shorter than the minimum distance L1 of the firing range 520. Moreover, a scanning angle 330 may be larger than a firing range angle 530.

In the above embodiments, an example has been shown in which the display device 1 has the detection device 30, but the present invention is not limited to this. For example, the interception system may have a terminal 10 which is not connected with any detection device 30. In other words, the interception system may have the terminal 10 which displays only the display area 130 calculated based on the area data received from another terminal. A combatant has this terminal 10 so that the interception area 100 of the interception system can be confirmed. In this case, since the combatant can confirm the interception area 100, he can make attention focus on his duty. In this way, the present invention is not limited to the large-scaled interception system and can be applied to the interception system of an optional scale. For example, the present invention can be applied to the interception system that is used in the small-scaled area from several kilo meters to tens of kilo meters.

In the above embodiments, an example has been shown in which the displaying section 28 displays the display area 130 that contains both of the first interception area 100-1 of the first weapon 40-1 and the second interception area 100-2 of another second weapon 40-2. However, the present invention is not limited to this. For example, the first interception area 100-1 and the second interception area 100-2 may be distinguished and displayed. For example, the first interception area 100-1 and the second interception area 100-2 may be displayed in different colors. Thus, since the first interception area 100-1 can be confirmed easily, it is possible to confirm the influence over the whole interception system when the arrangement and direction of the first weapon 40-1 are changed.

In the above embodiments, an example has been shown in which the interception area 100 is calculated by using the first detection plane 320-1 detected by the detection device 30. However, the present invention is not limited to this. For example, the interception area 100 may be calculated by using the landform data in addition to the first detection plane 320-1 detected by the detection device 30.

In the above embodiments, an example has been shown in which the high kill probability area 110 is calculated from the interception area 100 and the area 540 having the kill probability of 80%. However, the present invention is not limited to this. For example, the high kill probability area 110 may be calculated by excluding the first un-scanned space 310-1 and the second un-scanned space 310-2 from the area 540 having the kill probability of 80%.

In the above embodiments, an example has been shown in which the first display calculating section 23-1 receives the data showing interception area 100 from the second terminal 10-2 to calculate the second interception area 100-2 in the previously determined altitude. However, the present invention is not limited to this. An altitude may be determined for display of the whole interception system, and each terminal 10 may calculate the interception area 100 in the previously determined altitude as the display area 130. In this case, since each terminal 10 calculates the display area 130, the processing time at the whole becomes short.

In the above embodiments, an example has been shown in which the two-dimensional displaying section 24-1 displays the first interception area 100-1 and the second interception area 100-2 in the previously determined altitude. However, the present invention is not limited to this. For example, the first interception area 100-1 and the second interception area 100-2 in the altitude inputted from the input section 11 may be displayed. Also, the inputted altitude may be selected from a plurality of altitudes.

In the above embodiments, an example has been shown in which the three-dimensional displaying section 26-1 displays the interception area 100 contained in an area to the un-scanned space 310 from the position of terminal 10. However, the present invention is not limited to this. For example, the interception area 100 contained on a plane separate from the terminal 10 by a previously determined distance may be calculated and displayed. Specifically, as shown in FIG. 17, the interception area 100 contained on a first display plane 600 separate from the terminal 10 by the previously determined distance may be calculated and displayed. Also, as shown in FIG. 17, the interception area 100 contained in a plurality of display planes (first display plane 600, second display plane 610, third display plane 620, fourth display plane 630) may be calculated respectively. In this case, the display plane to be displayed is switched according to a distance selected by the input section 11.

The processing described above is only an example. The order and processing content of each step may be changed in the area in which a function is not obstructed. Also, the described configurations may be changed optionally in the area which the function is not obstructed.

The present invention is based on Japanese Patent Application No. JP 2018-025066 as a basis application and claims a priority based on it. The disclosure of the basis application is incorporated herein by reference.

What is claimed is:

1. A display apparatus of an interception area comprising:
   a first detection device configured to scan a first area containing at least a part of a firing range of a first weapon to detect an obstacle; and
   a first terminal,
   wherein the first terminal comprises:
   a first area calculating section configured to calculate a first interception area in which the first weapon is possible to intercept, based on data of the detected obstacle and data of the first weapon;
   a first display calculating section configured to calculate a first display area showing the first interception area on a screen based on the first interception area; and
   a first displaying section configured to display the first display area, wherein the first area calculating section generates first area data showing the first interception area, wherein the first display calculating section receives second area data generated by a second terminal, and calculates a second display area based on the second area data, wherein the second display area shows an area in which a second weapon is possible to intercept, on the screen, and wherein the first displaying section displays the second display area.

2. The display apparatus of an interception area according to claim 1, wherein the first area calculating section determines the first area based on the data of the first weapon, and determines the first interception area by excluding a first un-scanned space where is more distant from the first weapon than the obstacle and is in a same direction as the obstacle, from the firing range of the first weapon.

3. The display apparatus of the interception area according to claim 1, wherein the second area data contains a second interception area in which the second weapon is possible to intercept, wherein the first display calculating section calculates the second display area by excluding from the second interception area a space which is more distant from the first terminal than a second un-scanned space where the second interception area is excluded from a firing range of the second weapon, and which is in a same direction as the second un-scanned space, and wherein the first displaying section displays the first display area and the second display area three-dimensionally.

4. The display apparatus of an interception area according to claim 3, wherein the second area data contains data of the second weapon and a position of the second weapon, and wherein the first display calculating section calculates a firing range of the second weapon based on the data of the second weapon and the position of the second weapon, and calculates a second un-scanned space by excluding the second interception area from the firing range of the second weapon.

5. The display apparatus of an interception area according to claim 1, wherein the second area data contains the second interception area in which the second weapon is possible to intercept, wherein the first display calculating section calculates as the first display area the first interception area contained on a display plane separate by a previously determined distance from the position of the first terminal, and calculates as the second display area the second interception area contained on the display plane, and wherein the first displaying section displays the first display area and the second display area three-dimensionally.

6. The display apparatus of an interception area according to claim 5, wherein the first terminal further comprises an input device, wherein there are a plurality of the display planes, and wherein the first displaying section displays the first display area and the second display area on one of the plurality of display planes that is specified from the input device.

7. The display apparatus of an interception area according to claim 1, wherein the first area calculating section calculates a probability area as an area where an interception probability by the first weapon has been previously determined, based on the data of the first weapon, and calculates as a kill probability area a probability area contained in the first interception area, wherein the first display calculating section calculates a kill probability display area showing the kill probability area on the screen based on the kill probability area, and wherein the first displaying section displays the kill probability display area.

8. The display device of the interception area according to claim 1, wherein the first displaying section displays the first display area and the second display area distinguishably.

9. An interception system comprising:
a display apparatus; and
a mobile terminal,
wherein the display apparatus comprises:
a first detection device configured to scan a first area containing at least a part of a firing range of a first weapon to detect an obstacle; and
a first terminal,
wherein the first terminal comprises:
a first area calculating section configured to calculate a first interception area in which the first weapon is possible to intercept, based on data of the detected obstacle and data of the first weapon;
a first display calculating section configured to calculate a first display area showing the first interception area on a screen based on the first interception area; and
a first displaying section configured to display the first display area,
wherein the first area calculating section generates first area data showing the first interception area,
wherein the first display calculating section receives second area data generated by a second terminal, and calculates a second display area based on the second area data,
wherein the second display area shows an area in which a second weapon is possible to intercept, on the screen, and
wherein the first displaying section displays the second display area,
wherein the mobile terminal comprises:
a second display calculating section configured to receive the first area data from the first terminal and calculates the first display area; and
a second displaying section configured to display the first display area,
wherein the mobile terminal displays only the display area calculated based on the area data received from another terminal.

10. A displaying method of an interception area comprising:
scanning a first area containing at least a part of a firing range of a first weapon to detect an obstacle;
calculating a first interception area in which the first weapon is possible to intercept, based on data of the detected obstacle and data of the first weapon;
generating first area data containing the first interception area;
calculating a first display area showing the first interception area on a screen based on the first interception area;
receiving from another terminal second area data containing a second interception area in which a second weapon is possible to intercept;
calculating a second display area showing a second interception area on the screen based on the second area data; and
displaying the first display area and the second display area.

* * * * *